Nov. 19, 1940.  R. D. BROUWER  2,222,334
FASTENING DEVICE FOR RACE MEMBERS
Filed March 3, 1938

INVENTOR:
RODGER D. BROUWER,
BY Gales P. Moore
HIS ATTORNEY.

Patented Nov. 19, 1940

2,222,334

UNITED STATES PATENT OFFICE 2,222,334

FASTENING DEVICE FOR RACE MEMBERS

Rodger D. Brouwer, Bristol, Conn., assignor to General Motors Corporation, Detroit, Mich., a corporation of Delaware Application March 3, 1938, Serial No. 193,743

13 Claims. (Cl. 287—52.09)

This invention relates to fastening devices for race members and the like and comprises all of the features of novelty herein disclosed. An object of the invention is to provide improved means for securing a raceway sleeve or the like upon a shaft or other support. Another object is to provide a race fastening device which is simple, inexpensive and effective.

To these ends and also to improve generally upon devices of the character indicated, the invention consists in the various matters hereinafter described and claimed.

In the accompanying drawing.

Figure 1:
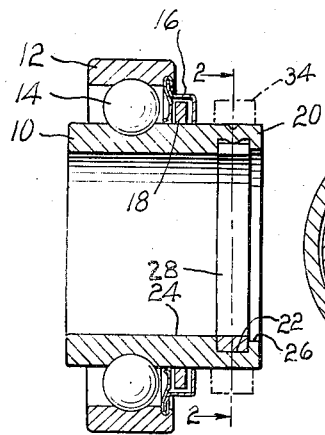
Fig. 1 is an axial sectional view of an antifriction bearing with a race fastening means attached.
Figure 2:
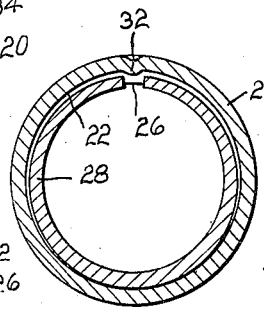
Fig. 2 is a cross sectional view on line 2—2 of Fig. 1.

In Fig. 1, the numeral 10 indicates an inner race ring or sleeve of an antifriction bearing having an outer race ring 12 and rolling elements 14 in the form of balls. If desired, the bearing may be sealed up at one or both ends, as by the two-part casing 16 attached to the outer race ring and enclosing a washer 18 which embraces the inner race ring. The foregoing is merely illustrative of a suitable bearing or other part to which the improved locking means may be applied.

Preferably one end of the inner race ring or sleeve has an axial extension or projection 20 which is provided with an internal groove 22. The bottom of the groove is concentric with the bore 24 of the sleeve and its outer side wall is formed by a rib or land 26 which is somewhat lower than the opposite side wall to facilitate assembly of an eccentric split ring 28. The inner surface of the ring is substantially concentric with the bore 24 and its outer surface is eccentric to the bottom of the groove. The thickest section of the ring substantially fills the groove. The ring tends to contract in order to have a tendency to grip the surface of a supporting shaft 30 which will ordinarily be only slightly smaller than the bore 24.

Figure 3:
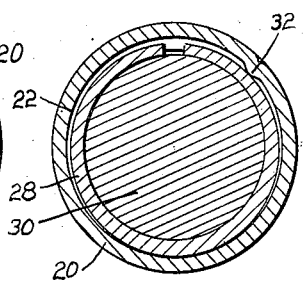
Fig. 3 is a view similar to Fig. 2 with the parts in clamping relation to a shaft.

At a point opposite to the middle of the concentric groove 22, the extension 20 is pressed in or otherwise provided with an internal bump or projection 32 entering the groove substantially radially for a portion of its depth. This bump is not deep enough to enter between the ends of the split ring but, when the bearing sleeve has relative angular movement with respect to the shaft and to the shaft-gripping eccentric ring, the bump will ride along the eccentric outer surface of the ring as indicated in Fig. 3. This produces a powerful contraction or clamping of the eccentric ring upon the shaft and wedges the eccentric ring between the race sleeve and the shaft. The clamping action will occur in either direction of angular movement depending upon which way the shaft and ring are turned. The eccentric ring and its concentric groove are desirably placed well beyond the rolling elements so that any distortion of the race sleeve may not affect the antifriction properties of the bearing. When the extension 20 of the inner race sleeve is thin and hence likely to be unduly stretched by the clamping action, a reinforcing ring or collar 34 may be pressed upon it as indicated by broken lines in Fig. 1.

Figure 4:
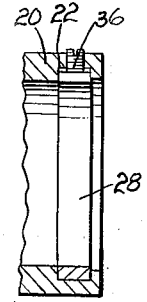
Fig. 4 is an axial sectional view of a modification of Fig. 1.

In Fig. 4, the bump or projection in the concentric groove 22 is made by a set screw 36 adjustably threaded in the extension 20.

Figure 5:
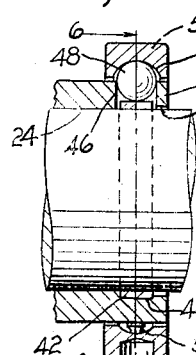
Fig. 5 is an axial sectional view of another modification.
Figure 6:
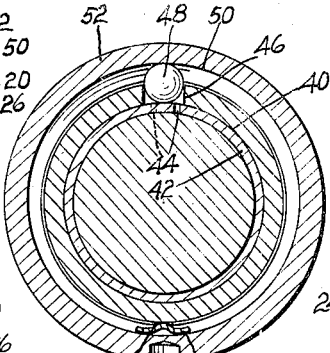
Fig. 6 is a cross sectional view on line 6—6 of Fig. 5.

In Figs. 5 and 6, the extension 20 of the inner race sleeve is provided with an internal groove 40 concentric with the bore 24 and loosely receiving a split ring 42 which is of uniform thickness. The ring is diagonally slit as indicated at 44 and tends to contract upon the shaft. It can be sprung into the groove past the land 26. The extension 20 has a hole 46 cut through it and intersecting the groove 40. In the hole is a wedging member in the form of a roller or ball 48 which tracks on the split ring and projects outwardly to track in an eccentric groove 50 in a ring or collar 52. The ring or collar surrounds but has clearance with the extension 20 so that it will bear against the ball. At a point 54 opposite to the hole 46, the extension preferably has welded thereto a leaf spring 56 whose free ends engage the bottom of the eccentric groove 50 and so tend to pull the collar against the ball and provide traction. The collar has a socket at 58 for a tool to hold the collar from rotation or to turn it.

To assemble the parts, the collar 52 is first slipped over the extension 20 and its spring 56, the clearance between the collar and the extension providing a space to let in the spring. The roller or ball is then inserted in the deep part of the eccentric groove 50 by passing the ball through the groove 40 and the intersecting hole 46 from the interior. The split ring 42 is then contracted and sprung into its concentric groove. The assembled unit is ready for shipment and sliding over a shaft. To clamp the unit upon the shaft, the shaft and the collar 52 are given relative angular movement to bring a shallower portion of the eccentric groove against the ball and to force the ball towards the split ring and the shaft. The split ring provides a hardened surface to avoid marring of the shaft by the ball. The purpose of the leaf spring is to insure pressure or traction of the ball against the split ring 42 if the ball should be initially below the shaft. Otherwise the shaft and the split ring might turn freely without any clamping effect because the split ring and its groove 40 are concentric with the shaft. However, when the shaft and the split ring turn with respect to the collar, the tractive effect of the split ring and the collar on the interposed ball causes the ball to rotate on its axis. The ball and the extension 20 accordingly travel angularly within the collar until the ball binds in a shallower portion of the eccentric groove. The sliding friction of the spring 56 in the groove is small and decreases (as the spring gets to a deeper portion of the eccentric groove) and hence will not prevent this angular movement. The device is self-locking under all conditions. The tractive effect can be obtained by manually pressing the collar sidewise thus tending to press the ball in against the split ring; hence the spring can be omitted. The roller or ball provides a projection or bump adapted to wedge against an eccentric surface to clamp a sleeve upon a support.

Figure 7:
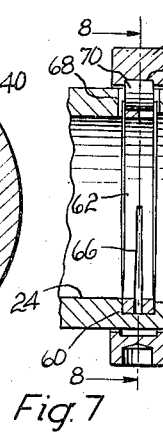
Fig. 7 is an axial sectional view of a modification.
Figures 8, 9:
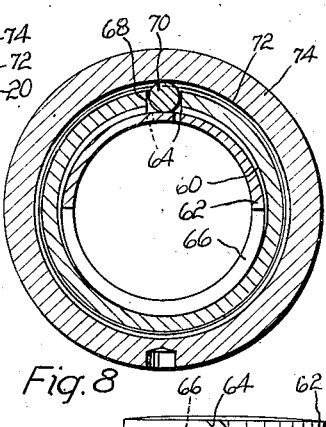
Fig. 8 is a cross sectional view on line 8—8 of Fig. 7.
Fig. 9 is a plan view of the split eccentric ring of Figs. 7 and 8.

In Figs. 7 and 8, a concentric groove 60 is formed in the extension 20 to receive a split spring ring 62 which has its inner surface concentric with the bore 24 and its outer surface eccentric. The ring 62 is split diagonally at its thinner portion as indicated at 64 and is slit lengthwise through the middle of its thicker portion as indicated at 66. The ring tends to contract to grip a shaft and the slit portions at 66 are made resilient with a tendency to spring apart to have light frictional engagement with the side walls of the groove 60. This friction is to initially hold the split ring with its thinnest portion or ends adjacent to a hole 68 in the extension 20. The hole receives a cylindrical roller 70 adapted to engage the eccentric outer surface of the split ring. The roller also engages and tracks on an internal groove 72 in a ring or collar 74 which surrounds and has clearance with the extension 20. The groove 72 is concentric with the axis of the collar. The collar preferably has sockets to receive a tool for holding it from rotation or to turn it.

When the unit is slipped over a shaft, and the shaft turns while the collar 74 is held from turning, the eccentric ring, which tends to contract, grips and turns with the shaft, overcoming the friction of the slit portions 66 with the side walls of the groove 60, causing the roller to rotate on its axis and travel bodily with the sleeve but at slower speed than the eccentric ring. This brings a thicker portion of the eccentric ring under the roller thus causing the roller to wedge itself between the collar and the ring and powerfully jamming the ring against the shaft. The roller provides a bump or projection projecting into a groove of the sleeve to wedge against an eccentric surface. Traction between the roller and the collar is insured if the collar is pressed sidewise so that the side wall of the groove engages the end of the roller.

Figure 10:
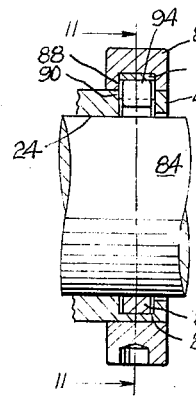
Fig. 10 is an axial sectional view of a modification.
Figure 11:
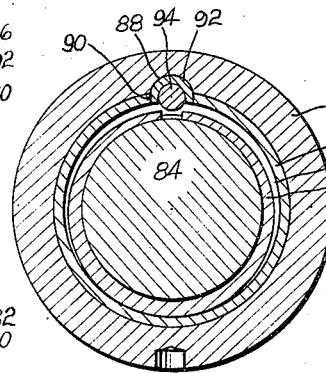
Fig. 11 is a cross sectional view on line 11—11 of Fig. 10.
Figure 12:
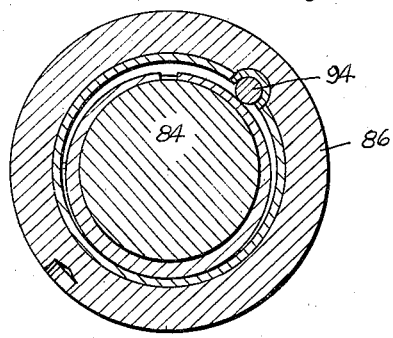
Fig. 12 is a view similar to Fig. 11 with some parts in another position.

In Figs. 10, 11 and 12, the extension 20 has an internal groove 80 concentric with the bore 24 to receive an eccentric ring 82. The ring is split and tends to contract lightly upon the shaft 84. A reinforcing ring or collar 86 is press-fitted on the extension 20 and has an internal recess 88 registering with a hole 90 cut through the extension 20 to intersect the concentric groove 80. An arcuate shoe 92 of brass or other bearing material is secured in the recess with its ends in the hole 90. The shoe forms a bearing for a roller 94 which projects through the hole into the concentric groove 80 nearly as far as the thin ends of the eccentric ring. When the shaft and the split ring have relative rotation with respect to the remaining parts, the roller rolls upon the eccentric ring to a thicker portion thereof, as indicated in Fig. 12, and wedges the ring upon the shaft. The roller thus forms a bump or projection projecting into a concentric groove to wedge against an eccentric surface.

I claim:

1. In a device of the character described, a sleeve having a groove whose bottom is concentric with the bore of the sleeve, an eccentric ring in the groove, a projection or bump entering the groove substantially radially for a distance less than the depth of the groove, and a collar extending around the sleeve opposite to the eccentric ring; substantially as described.

2. In a device of the character described, a sleeve having an internal groove, a ring in the groove, a collar surrounding the sleeve and the ring, a roller wedging member between the collar and the ring, one of said last-named members having an eccentric tracking surface opposed to the other member; substantially as described.

3. In a device of the character described, a sleeve having a groove whose bottom is concentric with the bore of the sleeve, an eccentric ring in the groove, the sleeve having a hole intersecting the groove, a collar surrounding the sleeve, and a roller in said hole and interposed between the collar and the eccentric ring; substantially as described.

4. In a device of the character described, a sleeve having an internal groove, a ring in the groove, a collar surrounding the sleeve and the ring and having an internal groove, a roller adapted to track between the groove of the collar and the external surface of the ring, and one of the roller tracking surfaces being eccentric with respect to the other; substantially as described.

5. In a device of the character described, a sleeve having an internal groove and a hole intersecting the groove, a split ring in the groove, a collar surrounding the sleeve, a roller in the hole and adapted to engage the external surface of the ring and the internal surface of the collar, and one of said surfaces being eccentric with respect to the other; substantially as described.

6. In a device of the character described, a sleeve having an internal groove and a hole intersecting the groove, a ring in the groove, a collar surrounding the sleeve in clearance relation thereto, a collar having an internal groove, a roller in the hole and adapted to engage the external surface of the ring and the internal groove in the collar, one of the roller engaging surfaces being eccentric with respect to the other; substantially as described.

7. In a device of the character described, a sleeve having an internal groove and a hole intersecting the groove, a ring in the groove, a collar surrounding the sleeve and the ring, a roller in the hole and adapted to track on the exterior surface of the ring and the interior surface of the collar, one of the tracking surfaces being eccentric with respect to the other, and the ring being diagonally split; substantially as described.

8. In a device of the character described, a sleeve having a groove whose bottom is concentric with the bore of the sleeve, an eccentric ring in the groove, the sleeve having a hole intersecting the groove, a collar surrounding the sleeve, a roller in said hole and adapted to engage the collar and the eccentric ring, and the eccentric ring having a springy portion providing frictional engagement with the walls of the groove; substantially as described.

9. In a device of the character described, a sleeve having a groove whose bottom is concentric with the bore of the sleeve, an eccentric ring in the groove, a wedging member projecting into the groove, and the eccentric ring having means to hold it with its thinnest section adjacent to the wedging member; substantially as described.

10. In a device of the character described, a sleeve having a groove whose bottom is concentric with the bore of the sleeve, an eccentric ring in the groove, a wedging member projecting into the groove, and the eccentric ring being slit to provide springy portions frictionally engaging the side walls of the groove; substantially as described.

11. In a device of the character described, a sleeve having a groove, a ring in the groove and having a surface eccentric with respect to the bottom of the groove, a circular member fixed to the sleeve and having a recess, and a roller in the recess and projecting into the groove of the sleeve to engage said eccentric surface of the ring; substantially as described.

12. In a device of the character described, a sleeve having an internal groove and a hole intersecting the groove, a ring in the groove and having an external surface eccentric with respect to the bottom of the groove, a collar surrounding the sleeve and having an internal recess in registration with the hole in the sleeve, and a roller journalled in the recess and projecting through the hole into the groove for tracking engagement with the eccentric surface of the ring; substantially as described.

13. In a device of the character described, a sleeve having a groove whose bottom is concentric with the axis of the sleeve, a ring in the groove and having a tracking surface facing the bottom of the groove, a circular member concentric with the sleeve and having a tracking surface facing the tracking surface of the ring, the sleeve having a hole intersecting its groove, a roller in the hole and adapted to engage said tracking surfaces, and one of the tracking surfaces being eccentric with respect to the other; substantially as described.

RODGER D. BROUWER.